United States Patent
Zhou et al.

(10) Patent No.: US 11,796,991 B2
(45) Date of Patent: Oct. 24, 2023

(54) CONTEXT-AWARENESS IN PREVENTATIVE MAINTENANCE

(71) Applicant: International Business Machines Corporation, Armonk, NY (US)

(72) Inventors: Nianjun Zhou, Chappaqua, NY (US); Dhaval Patel, White Plains, NY (US); Jayant R. Kalagnanam, Briarcliff Manor, NY (US)

(73) Assignee: International Business Machines Corporation, Armonk, NY (US)

(*) Notice: Subject to any disclaimer, the term of this patent is extended or adjusted under 35 U.S.C. 154(b) by 646 days.

(21) Appl. No.: 16/830,672

(22) Filed: Mar. 26, 2020

(65) Prior Publication Data
US 2021/0302953 A1 Sep. 30, 2021

(51) Int. Cl.
*G05B 23/02* (2006.01)
*G06N 20/00* (2019.01)
*G06N 5/04* (2023.01)

(52) U.S. Cl.
CPC ....... *G05B 23/0283* (2013.01); *G05B 23/027* (2013.01); *G05B 23/0245* (2013.01); *G05B 23/0297* (2013.01); *G06N 5/04* (2013.01); *G06N 20/00* (2019.01)

(58) Field of Classification Search
CPC .............. G05B 23/0245; G05B 23/027; G05B 23/0297; G06N 5/04; G06N 20/00; G06N 5/025
USPC .......................................... 706/11
See application file for complete search history.

(56) References Cited

U.S. PATENT DOCUMENTS

| | | | |
|---|---|---|---|
| 7,730,364 B2 | 6/2010 | Chang et al. | |
| 7,750,639 B2 | 7/2010 | Quint et al. | |
| 7,979,240 B2 | 7/2011 | Fielder | |
| 9,311,615 B2 | 4/2016 | Davenport et al. | |
| 2012/0130759 A1 | 5/2012 | Davenport et al. | |

(Continued)

OTHER PUBLICATIONS

"Ajitesh Kumar, What are Features in Machine Learning?, May 8, 2022, https://vitalflux.com/what-are-features-in-machine-learning/" (Year: 2022).*
Spiegel et al., "Cost-Sensitive Learning for Predictive Maintenance," arXiv:1809.10979v1 [cs.LG] Sep. 28, 2018.
Chakraborty et al. "Fall-curve: A Novel primitive for IoT Fault Detection and Isolation," 2018 Association for Computing Machinery, 13 pages.

(Continued)

*Primary Examiner* — Santosh R Poudel
(74) *Attorney, Agent, or Firm* — Patterson + Sheridan, LLP

(57) ABSTRACT

Context-awareness in preventative maintenance is provided by receiving sensor data from a plurality of monitored systems; extracting a first plurality of features from a set of work orders for the monitored systems, wherein individual work orders include a root cause analysis for a context in which a nonconformance in an indicated monitored system occurred; predicting, via a machine learning model, a nonconformance likelihood for each monitored system based on the first plurality of features; selecting a subset of alerts based on predicted nonconformance likelihoods for the monitored systems; in response to receiving a user selection from the first set of alerts and a reason for the user selection, recording the reason as a modifier for the machine learning model; and updating the machine learning model to predict the subsequent nonconformance likelihoods using a second plurality of features that excludes the additional feature identified from the first plurality of features.

20 Claims, 9 Drawing Sheets

(56) References Cited

U.S. PATENT DOCUMENTS

| | | | |
|---|---|---|---|
| 2013/0151156 A1 | 6/2013 | Noui-Mehidi et al. | |
| 2013/0325762 A1* | 12/2013 | Raileanu | B61L 27/57 |
| | | | 706/12 |
| 2015/0242621 A1* | 8/2015 | Jackson | G06F 21/6281 |
| | | | 726/17 |
| 2017/0316320 A1* | 11/2017 | Jamjoom | G06Q 10/109 |
| 2017/0351787 A1 | 12/2017 | Kapuschat et al. | |
| 2018/0239500 A1* | 8/2018 | Allen | G06F 3/0488 |
| 2018/0314573 A1* | 11/2018 | Chang | G06N 20/00 |
| 2019/0102488 A1 | 4/2019 | Santarone et al. | |
| 2019/0310620 A1* | 10/2019 | Kamiguti | G06F 11/0736 |
| 2021/0012115 A1* | 1/2021 | Bodbyl | G08B 21/0261 |
| 2021/0124345 A1* | 4/2021 | Hayzen | G06Q 10/20 |

OTHER PUBLICATIONS

Gugulothu et al."Predicting Remaining Useful Life using Time Series Embeddings based on Recurrent Neural," arXiv:1709.01073v2 [cs.LG] Oct. 6, 2017.

Yoon et al., "Semi-supervised Learning with Deep Generative Models for Asset Failure Prediction," arXiv:1709.00845v1 [cs.LG] Sep. 4, 2017.

Chawla et al., "SMOTE: Synthetic Minority Over-sampling Technique," Journal of Artificial Intelligence Research 16 (2002) 321-357 Submitted Sep. 2001; published Jun. 2002.

Victoria Fridholm, "Improve Maintenance Effectiveness and Efficiency by Using Historical Breakdown Data from a CMMS", Mälardalen University, 2018, pp. 1-92.

* cited by examiner

CONTEXT-AWARENESS IN PREVENTATIVE MAINTENANCE

BACKGROUND

The present invention relates to preventative maintenance, and more specifically, to identifying and using the contexts for nonconformances (including total failures and sub-optimal operations) in the operation of various monitored systems from work orders. Preventative maintenance seeks to identify a system that will enter a nonconforming state before that system enters the nonconforming state so that a backup system can be brought online or the system can be repaired before the system stops operating within operational tolerances (including shutting down).

In some cases, various components are manufactured with an expected lifetime, and preventative maintenance including replacing those components at or before the expected lifetime is reached (e.g., filters are replaced every M months or H hours of operation). In other cases, various mechanical sensors or human-based inspections monitor the operation of the systems to help predict when a system is approaching nonconformance (e.g., when a flowrate through the filter changes, when an operator sees build-up on the filter). However, preventative maintenance based on expected lifetimes and sensors/inspections may result in overwork (e.g., removing/repairing components with lifetime remaining) and can miss identifying a root cause (e.g., leading to an unexpected nonconformance). These deficiencies in expected lifetime and sensor/inspection based preventative maintenance can be attributed, at least in part, to a lack of context awareness for how the system (or sub-component) is operating.

In the various systems monitored for preventative maintenance, various work orders are generated and stored based on interactions with the monitored systems, such as, for example, when a maintenance technician repairs or replaces a component, an operator adjusts a mode, speed, or duration of operation, or auxiliary systems are maintained or operated. These work orders can provide additional context for interpreting the sensor/inspection data and adjusting the expected lifetime of the components, but can be full of idiosyncrasies, which complicate the analysis thereof. For example, work orders can include human-input natural language (e.g., a comments section) to describe the issues and are filled out idiosyncratically by different persons, can be incomplete, can include less accurate data (e.g., a work request identifies one or more proposed root causes that are not the actual root cause), or otherwise require an advanced understanding of the monitored system to interpret. Human interpretation of these work orders is time consuming, and limited by the availability of subject matter experts, particularly as the volume of work orders increases, and human operators may therefore miss or misidentify various trends as those persons become specialized or focused on various locations or systems. Similarly, machine learning-based interpretation of these work orders can be hindered by the idiosyncrasies in the work orders, and accordingly the machine learning models may miss or misidentify the various trends in the work orders. Given the complex nature of the various systems monitored for preventative maintenance, removing or reducing the idiosyncratic portions of the work orders has generally be ineffective or counterproductive (e.g., operators and technicians filling in placeholder values) for machine learning based analysis of the work orders.

SUMMARY

According to one embodiment of the present invention, a method is provided for context-awareness in preventative maintenance that includes: receiving sensor data from a plurality of monitored systems; extracting a first plurality of features from a set of work orders for the plurality of monitored systems, wherein individual work orders in the set of work orders include a root cause analysis for a context in which a nonconformance in an indicated monitored system occurred; predicting, via a machine learning model, a nonconformance likelihood for each monitored system in the plurality of monitored systems based on the first plurality of features; generating a first set of alerts comprising a subset of alerts selected based on predicted nonconformance likelihoods for the plurality of monitored systems and based on operational rules; in response to receiving a user selection indicating an acceptance or rejection of one or more of the alerts from the first set of alerts and a reason for the user selection of the selected alerts, recording the reason as an additional feature to combine with existing root cause and context analysis as a modifier for the machine learning model; and updating the machine learning model to predict subsequent nonconformance likelihoods using a second plurality of features that excludes the additional feature identified from the first plurality of features.

According to one embodiment of the present invention, a computer readable storage medium is provided for context-awareness in preventative maintenance that includes instructions that when executed by a processor enable the processor to perform operations comprising: receiving sensor data from a plurality of monitored systems; extracting a first plurality of features from a set of work orders for the plurality of monitored systems, wherein individual work orders in the set of work orders include a root cause analysis for a context in which a nonconformance in an indicated monitored system occurred; predicting, via a machine learning model, a nonconformance likelihood for each monitored system in the plurality of monitored systems based on the first plurality of features; generating a first set of alerts comprising a subset of alerts selected based on predicted nonconformance likelihoods for the plurality of monitored systems and based on operational rules; in response to receiving a user selection indicating an acceptance or rejection of one or more of the alerts from the first set of alerts and a reason for the user selection of the selected alerts, recording the reason as an additional feature to combine with existing root cause and context analysis as a modifier for the machine learning model; and updating the machine learning model to predict subsequent nonconformance likelihoods using a second plurality of features that excludes the additional feature identified from the first plurality of features.

According to one embodiment of the present invention, a system is provided for context-awareness in preventative maintenance that includes: a processor; and a memory including instructions that when executed by the processor enable the processor to: receive sensor data from a plurality of monitored systems; extract a first plurality of features from a set of work orders for the plurality of monitored systems, wherein individual work orders in the set of work orders include a root cause analysis for a context in which a nonconformance in an indicated monitored system occurred; predict, via a machine learning model, a nonconformance likelihood for each monitored system in the plurality of monitored systems based on the first plurality of features; generate a first set of alerts comprising a subset of alerts selected based on predicted nonconformance likelihoods for the plurality of monitored systems and based on operational rules; in response to receiving a user selection indicating an acceptance or rejection of one or more of the alerts from the first set of alerts and a reason for the user selection of the selected alerts, record the reason as an additional feature to combine with existing root cause and context analysis as a modifier for the machine learning model; and update the machine learning model to predict subsequent nonconformance likelihoods using a second plurality of features that excludes the additional feature identified from the first plurality of features.

DETAILED DESCRIPTION

Figure 1:
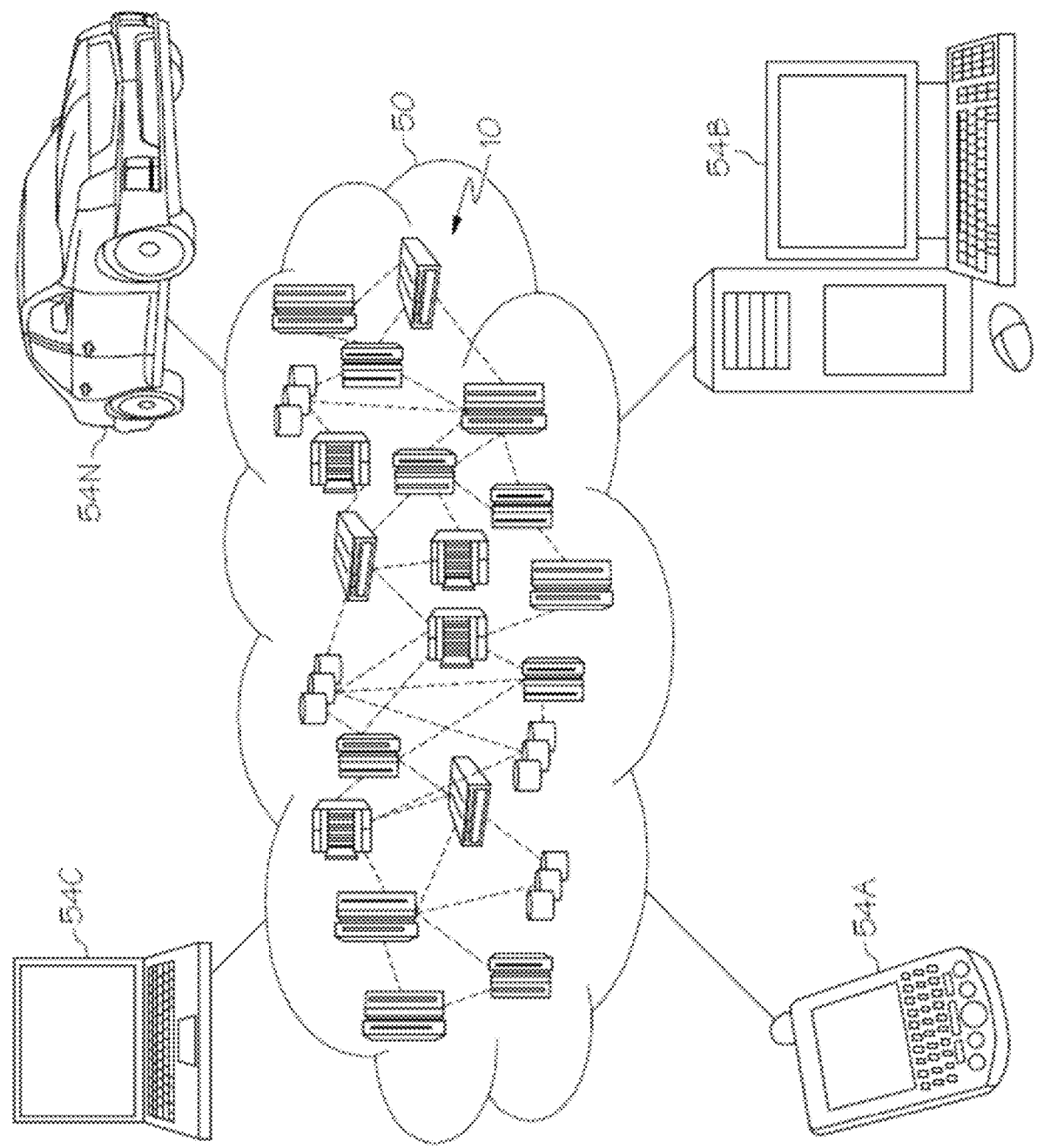
FIG. 1 depicts a cloud computing environment, according to embodiments of the present disclosure.

The present disclosure addresses deficiencies in the current preventative maintenance systems that leverage the strengths of rules-based analysis, human analysis, and machine learning (ML)-based analysis while mitigating the shortcomings thereof by using context-aware alerts. A model is trained for ML-based analysis for historical work word combining with sensor/inspection based data to determine whether to generate an alert for human-based analysis. Human-based input is confined to a candidate set of alerts, thus focusing human analysis to the top-k potential nonconformances, and is used to determine whether to clear, address, or continue observing a given monitored system for an upcoming nonconformance. As human-based inputs are received, the ML model adjusts the rules-based analysis of the work order/sensor/inspection data, which provide a faster analysis than the ML model. The features related to the decision to act on an alert are identified to further improve the data presented for human analysis, further improving and streamlining the analysis process.

Aiding the human user in making the decision for how to respond to a presented alert, the context-aware preventative maintenance system uses live data from sensors related to the operation of the systems monitored for preventative maintenance as well as historical work order information for previous nonconformances in the system and related systems. As part of the features used for root causes analysis, those features combined with the sensor data, providing the more accurate prediction model for the failure or nonconformances.

In addition, the work orders provide explanations of the problems, what resources were needed to resolve the problems, what labor was required to resolved the problem, how long the problem lasted from identification to resolution, and what previous problems the given system has faced (and how or whether those previous problems were resolved). Contextual data (including weather data and system status data gleaned from the historical work orders) augment the sensor data received from the systems, so that the alerts can identify with greater granularity what components of a given system should be identified in the alert as candidate causes for a predicted nonconformance.

Although various examples provided in the present disclosure relate to specific monitored systems (e.g., pumps, wells, filters), the present disclosure contemplates that a preventative maintenance system as described herein can be used with other monitored systems that are located at fixed locations. Accordingly, one of skill in the art will recognize that the examples provided herein are non-limiting to what monitored systems the preventative system can be applied to.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
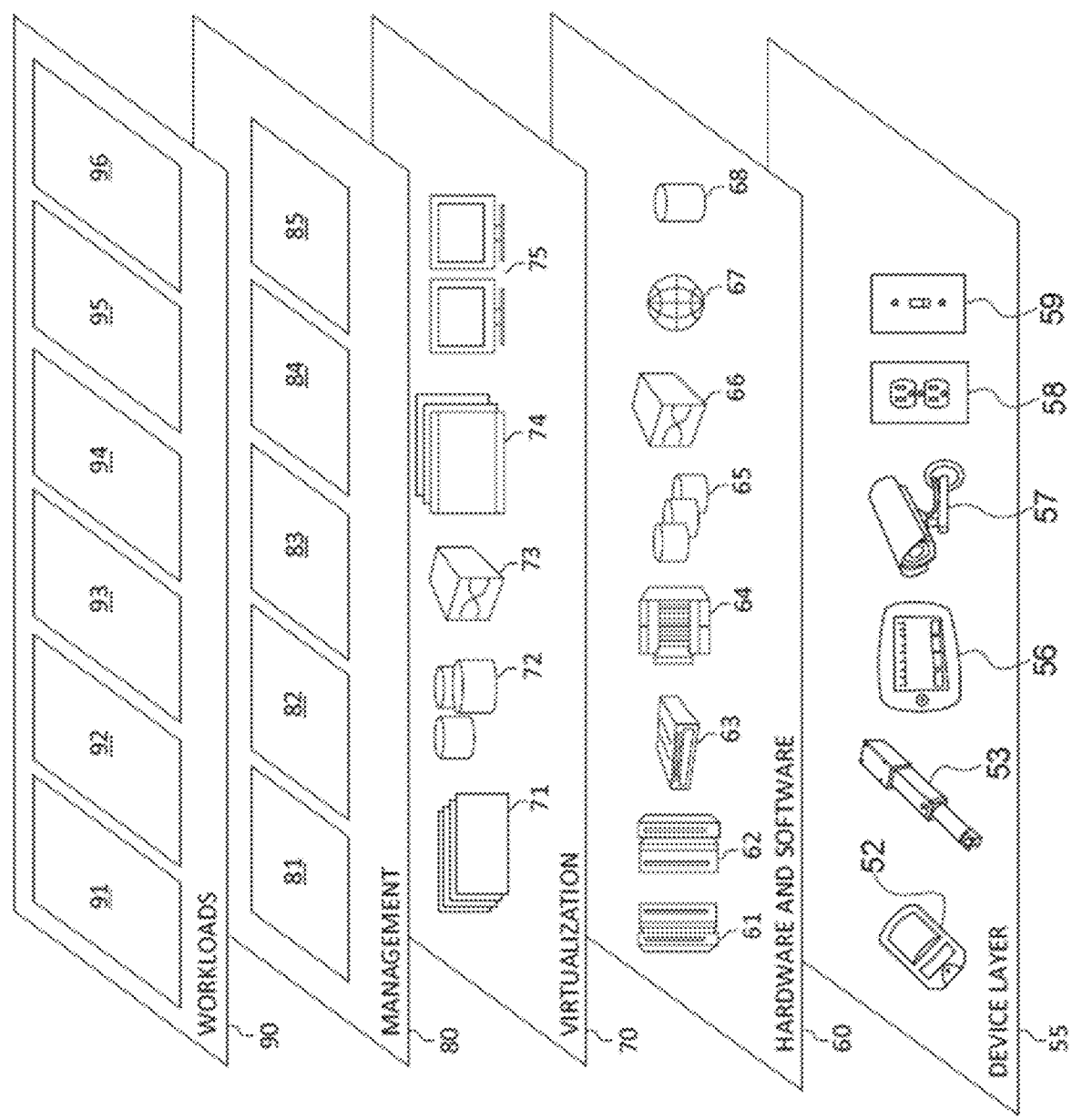
FIG. 2 depicts abstraction model layers, according to embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and class balancing training datasets for intent authoring using search 96.

Figure 3:
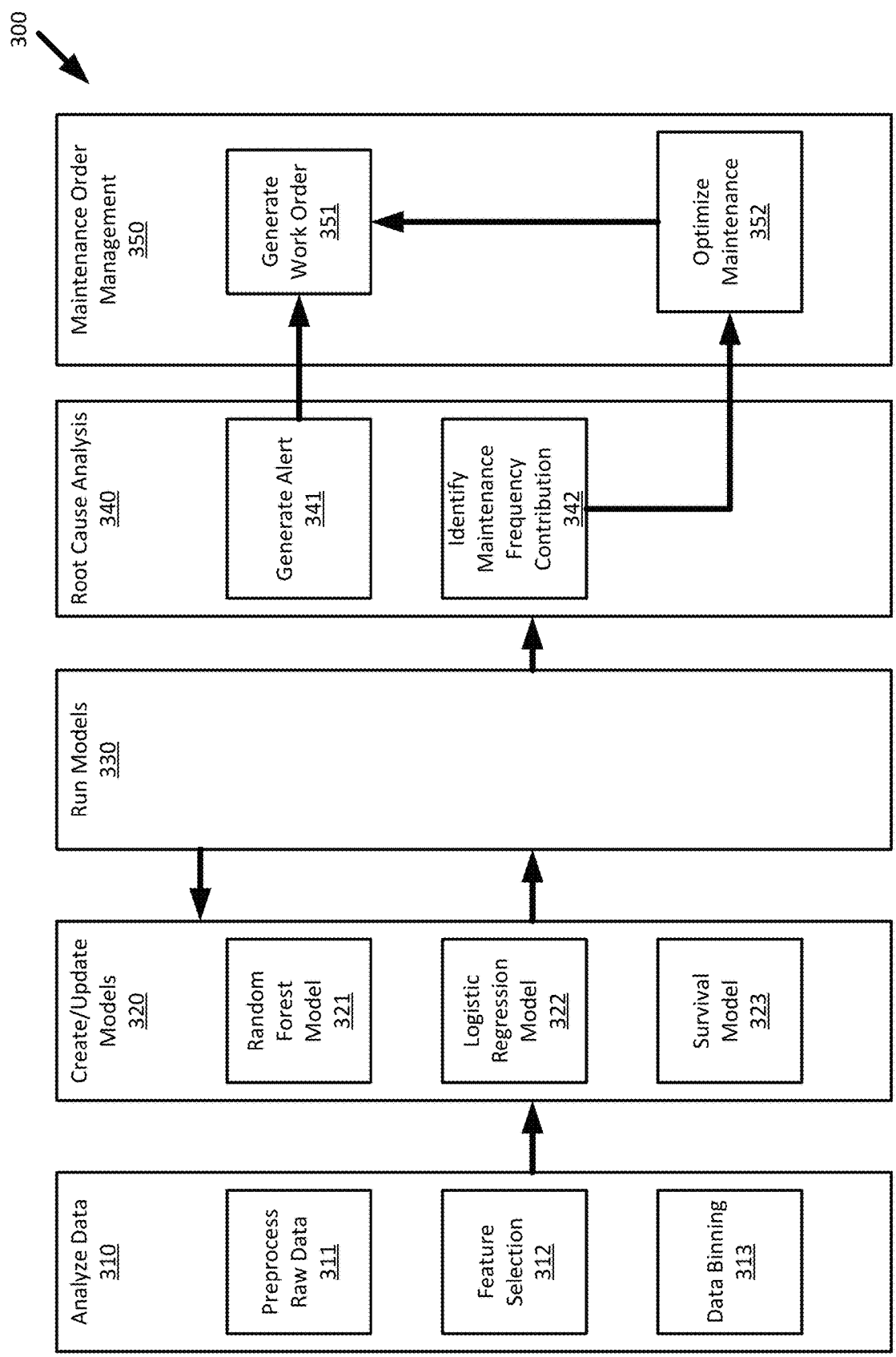
FIG. 3 illustrates a preventative maintenance flow, according to embodiments of the present disclosure.

FIG. 3 illustrates a preventative maintenance flow 300, according to embodiments of the present disclosure. In the preventative maintenance flow 300, data are analyzed in block 310, which can include preprocessing raw data (per block 311) to standardize the data to a shared format for later processing so that data received from different sources can be compared against one another, feature selection (per block 312) to extract particular data elements for analysis in one or more machine learning models, and data binning (per block 313) to group or cluster data point having similar ranges of values into "bins" to simplify or reduce the number of data points that are included in the data set for analysis.

In block 320, models for analyzing the data set are created and/or updated. The various models can include random forest models (per block 321), logistic regression models (per block 322), and survival models (per block 323) that are created, updated, and improved across several rounds of analysis.

In block 330, an operator runs the data set through the models and optionally returns to block 320 for further updates and iterations to the models, or when a preset number of iterations have occurred or the output settles on a normalized accuracy value, the operator finalizes the one or more models and proceeds to block 340.

In block 340, the operator uses the finalized model(s) for root cause analysis on live data, including work orders received from the field. The root cause analyses includes generating alerts (per block 341) when the incoming data exceed various identified threshold in operation rule sets and identifying the maintenance frequency contribution (per block 342) of various features on the operational status of the systems that are monitored for preventative maintenance. The outputs from the root cause analysis in block 340 (e.g., generated alerts and/or maintenance frequency contribution determinations) are provided for maintenance order management per block 350.

In block 350, the operator can optimize maintenance schemes for the systems (per block 352) based on the identified maintenance frequency contributions (from block 342), and generate work orders (per block 351) for those systems based on the generated alerts (from block 341) and/or the maintenance optimizations (per block 352). The optimizations can include early alerting based on the machine learning models identifying a pre-nonconforming state in a monitored system so that a work order can be generated ahead of a failure or other nonconformance in the system at a time that is convenient for the technicians, for replacement parts to be ordered ahead of time, production can be shifted to another system for maintenance, and/or so that management can be apprised of a potential shortfall in production until the maintenance issue is resolved.

Figure 4:
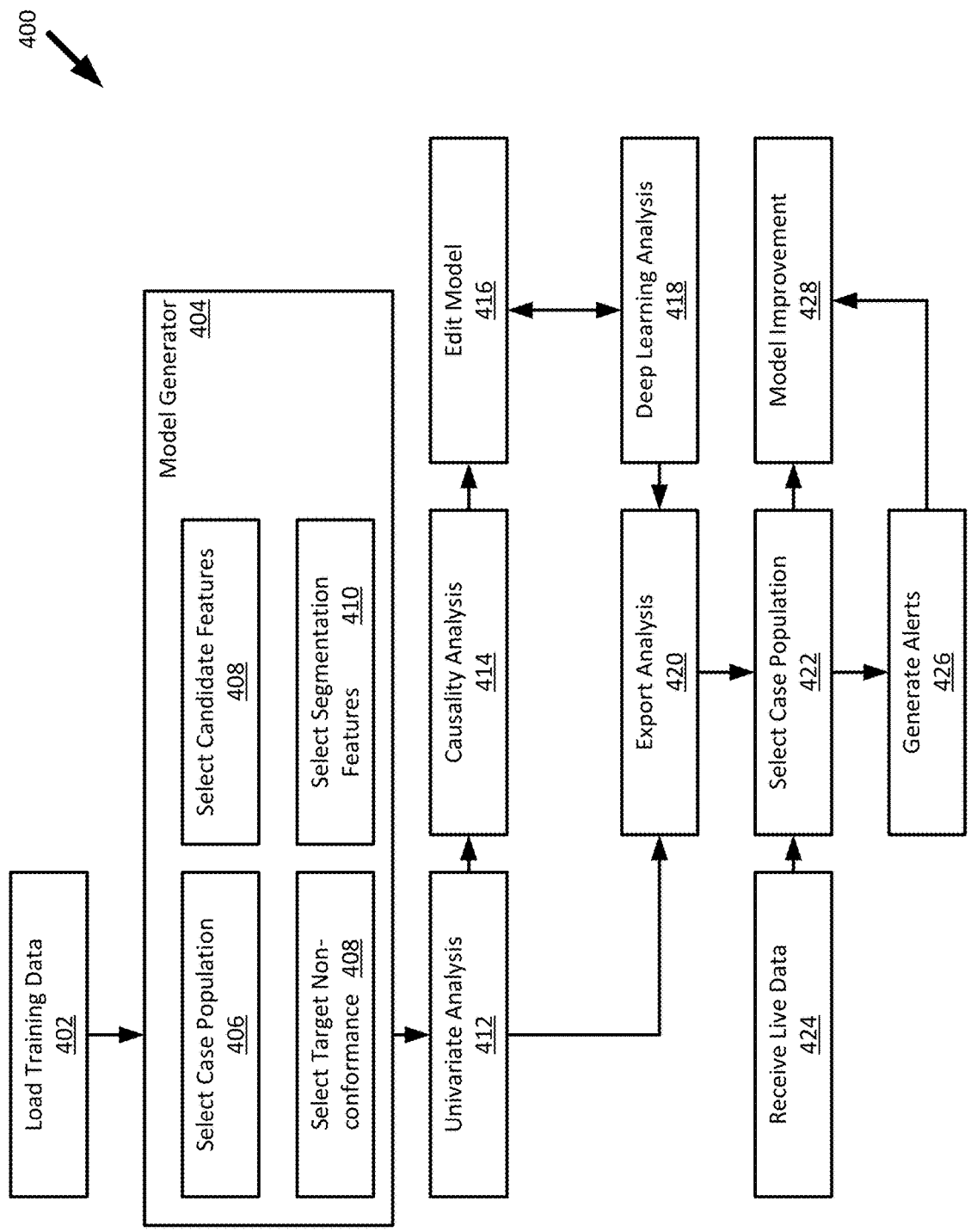
FIG. 4 illustrates an operational flow for a preventative maintenance system, according to embodiments of the present disclosure.

FIG. 4 illustrates an operational flow 400 for a preventative maintenance system, according to embodiments of the present disclosure. The operational flow 400, begins with block 402, where an operator loads training data into a model generator 404. The model generator 404 uses the training data to select a case population of systems for analysis (per block 406) and selects candidate features (per block 408) for analysis from the training dataset. The model generator selects segmentation features (per block 410) to use when analyzing the data to identify targeted nonconformances (per block 412).

The model generator 404 may iterate through several rounds of analysis using the training data, which can include a supervised training dataset, to improve the accuracy of the models used to identify the targeted nonconformances, and to properly weight the segmentation features used to analyze the data. In some embodiments, the model generator 404 seeks to reduce the number of features analyzed in the model, thereby increasing the speed at which incoming data can be analyzed. In some embodiments, the features selected for reduction are identified as the features that are identified as having the lowest weights on the predictions of nonconformances, but can also include the features that are frequently found missing or absent from the datasets.

A univariate analysis is performed (per block 412) to evaluate each of the identified factors individually. The results of the univariate analyses undergo causality analysis (per block 414) to identify root causes for any nonconformances identified in the dataset, which are used to edit the model (per block 416) to refine the predictive power thereof. The model is edited using a deep learning analysis engine (per block 418) over several iterations to analyze and refine the model. When model refinement is complete, the analysis outcome, the refined model, key drivers, the prediction result (i.e., a predicted likelihood of nonconformity), and accuracy metrics for the model are exported to an end user for review. In some embodiments, the results of each of the univariate analyses (from block 412) are collectively provided to the end user to further identify key drivers, rankings, segments, and the predictive power of the univariate analysis.

When the end user is provided with the exported analysis results (including univariate and/or multivariate), the end user can select a case population (per block 422) for further analysis. The end user can select cases, individual systems, specified locations, specified types of systems, etc. for further analysis by the developed ML and rules based systems and eventually a human user (e.g., via a dashboard).

Live data are received (per block 424) according to the selected case population, and are analyzed according to the developed ML and rules based systems to generate various alerts (per block 426) when a given system is predicted with a threshold likelihood of experiencing a nonconformance within a given time range. These alerts (and the underlying analyses for why the alerts were generated) can be presented to a human user (e.g., via a dashboard) to determine which alerts deserve further attention. The selection or rejection of an alert presented for further analysis can be fed back into the operational rules and ML models to further refine how alerts and populations of interest are presented to the end users and thereby provide model improvements (per block 428). Model improvement can include the ranking of the various features in importance according to the human user, extracting the contribution of individual features from the human user's decision to accept/reject a given alert, and performing what-if analysis on the sensitivity of the human user to various changes to the reported values of the features.

Figure 5:
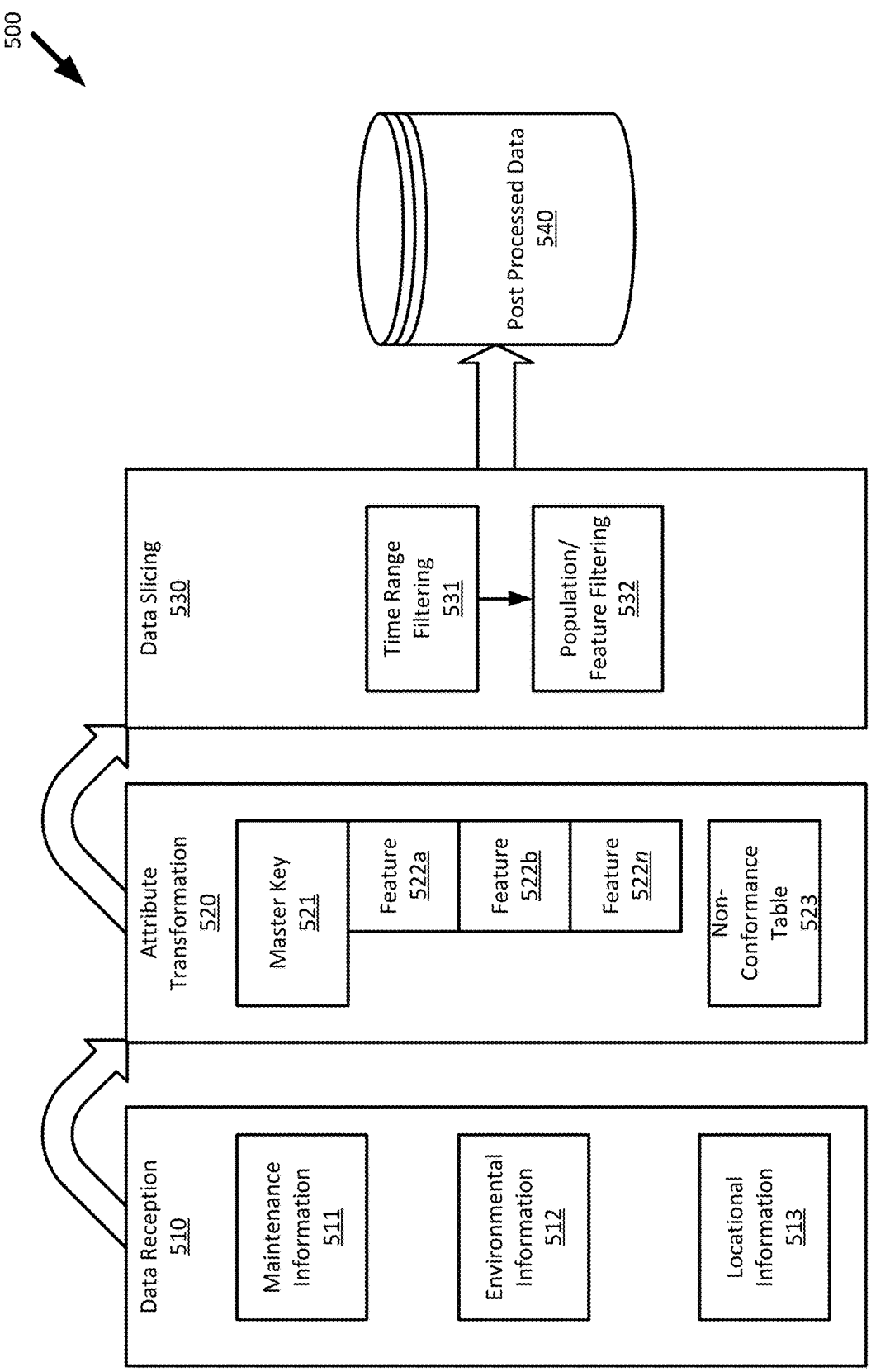
FIG. 5 illustrates a data processing flow, according to embodiments of the present disclosure.

FIG. 5 illustrates a data processing flow 500, according to embodiments of the present disclosure. In the data processing flow 500, data are received in block 510, which can maintenance information (per block 511) including sensor data from the various monitored systems, environmental information (per block 512) including weather data for various locations and locational information (per block 513) identifying various locations where the monitored systems are located.

At block 520, the received data undergo attribute transformation. Master keys 521 for each model identify various features 522a-n (generally, feature 522) that are to be extracted from the received data for use by the models. Attribute transformation can include data extraction, data normalization, data binning, missing value encoding, missing value extrapolation (e.g., providing a substitute value based on domain knowledge or other known values), and/or data ordering. The features 522 are selected based on the system being monitored for context aware preventative maintenance, and can include, for example, geo-clustering, installation times, down-time events, up-time counters, time of observation, etc. The models compare the features 522 against known nonconformance types and symptoms thereof defined in a nonconformance table 523, which defines various nonconformances that the models use the features 522 to attempt to forecast.

At block 530, the transformed data undergo data slicing. The data are filtered according to various time ranges (per block 531) and further filtered based on population or feature sets of particular interest for analysis (per block 532). The sliced and filtered data are then stored for later analysis, training, or re-training of the models in a post processed database 540. The sliced and filtered data are stored in a post processed database 540, which stores the data for use in generating or improving the machine learning models (e.g., as part of a training data set) as well as for analysis and nonconformance prediction in association with live data.

Figure 6:
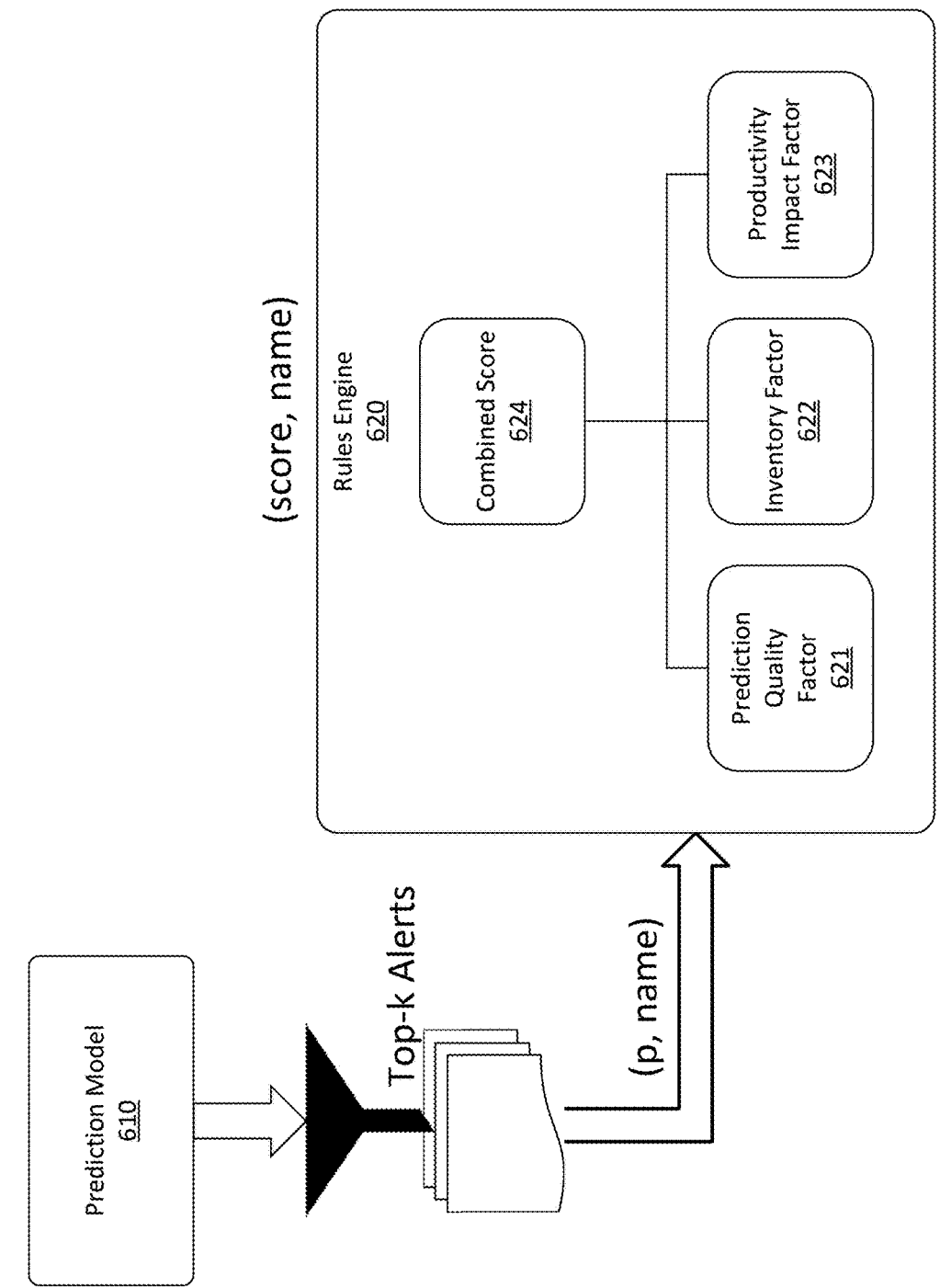
FIG. 6 illustrates a rules processing flow, according to embodiments of the present disclosure.

FIG. 6 illustrates a rules processing flow 600, according to embodiments of the present disclosure. The prediction model 610 identifies various assets, which are filtered to identify the top-k assets. In various embodiments, the top-k assets are the k (e.g., k=10) assets that have the highest predicted likelihoods of developing a nonconformance in a specific time range (e.g., within the next 30 days). These predicted likelihoods are the basis for which alerts are presented to human users via a preventative maintenance dashboard. However, additional factors beyond the alerts and the top-k filter report are also considered, which include various operational rules.

A rules engine 620 defines individual scores for a prediction quality factor 621, an inventory factor 622, and a productivity impact factor 623, which are aggregated into a combined score 624 for the asset. The aggregation can be configured based on the priority change of the individual factors (including a potential hierarchal scoring system). In various embodiments, the prediction quality factors 621 are based on or include metrics measuring the quality or accuracy of the models making the predictions, which can include false positive alert rates from various systems, the number of work orders or technician visits within a defined time period, and/or a clarity in the prediction message (e.g., a granularity of which component of the system is predicted to require preventative maintenance. In various embodiments, the inventory factors 622 are based on include metrics measuring an availability or lead-time difference in spare or replacement parts and/or technicians to perform assigned work orders. In various embodiments, the productivity impact factors 623 are based on or include metrics measuring the effects of a predicted nonconformance (e.g., downtime or reductions in capacity), which can include maintenance lengths (e.g., the time needed to implement the repair), availabilities of spare or replacement assets (e.g., to pick up slack from a nonconforming asset), impact of the predicted maintenance on the output of the asset, replacement versus repair considerations (including expected asset lifetime considerations).

Figure 7:
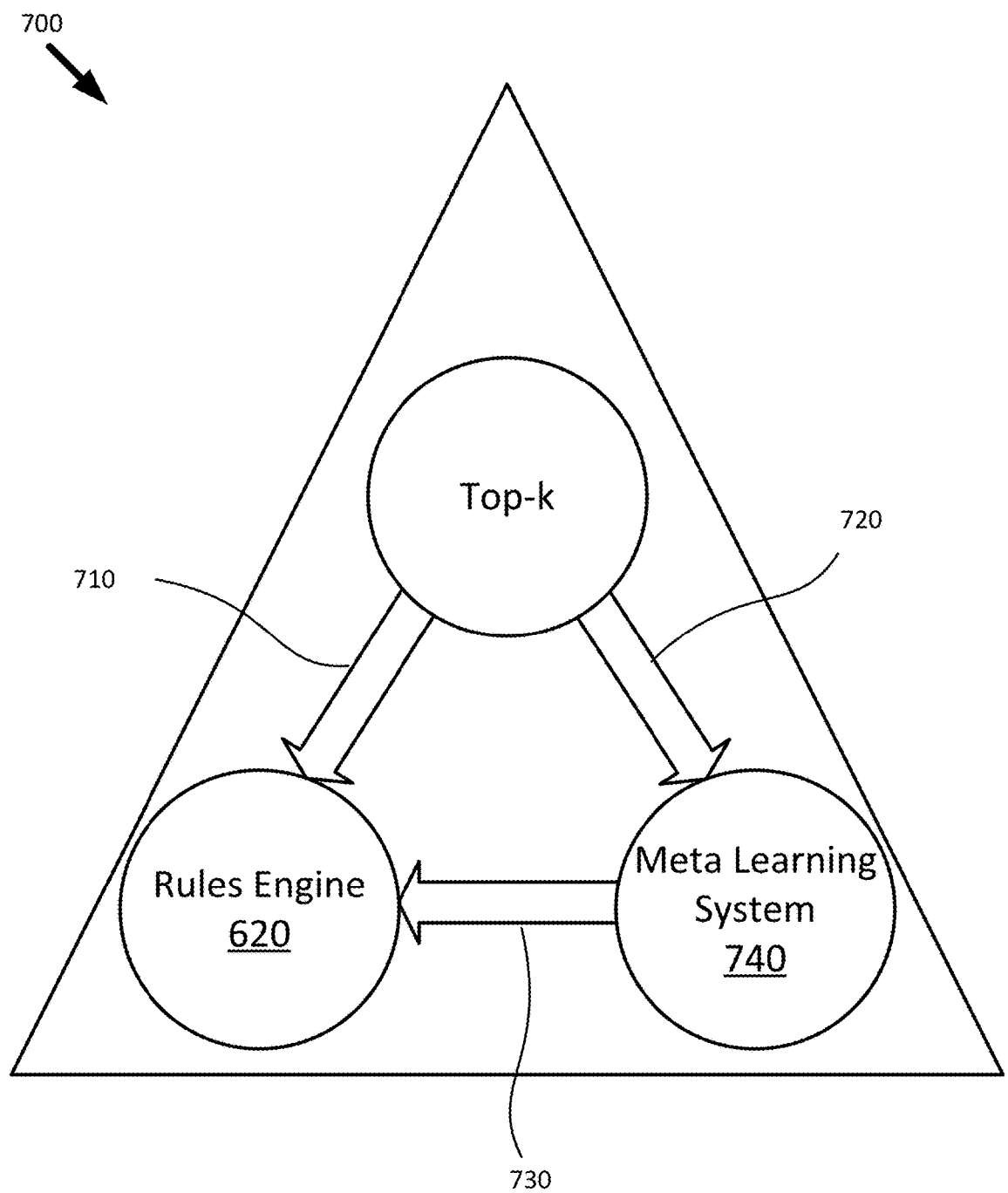
FIG. 7 illustrates a global learning and improvement flow, according to embodiments of the present disclosure.

FIG. 7 illustrates a global learning and improvement flow 700, according to embodiments of the present disclosure. As the top-k assets are identified, the identities of those assets and the reasons why those particular assets were identified as the top-k are provided to a rules engine 620 (per block 710) for processing. The identities of the top-k assets and the reasons why those particular assets were identified as the top-k are also provided (per block 720) to a meta learning system 740. The meta learning system 740 identifies modifications to existing operational rules, new operational rules, and existing operational rules for removal, and communicates (per block 730) changes to the rules set to the rules engine 620 so that the rules engine 620 is provided with more accurate and more efficient rules to process the top-k assets by in future iterations.

The flows discussed in FIGS. 3-7 provide for the creation and development of a context-aware preventative maintenance system. As the external context of where the monitored system is located, what conditions and status the monitored system has faced in the past, and historical work orders for the system (and related systems) are used to develop various ML and rules-based models, an operator is provided with a more in-depth root cause analysis that is not solely reliant on current sensor data from the monitored system to report a nonconformity in operations, but can predict a future nonconformance as it develops and before production is impacted. For example, although sensors may report that a pump is no longer producing output (e.g., a flowmeter at an output end reports zero output, a pressure sensor indicates to change in pressure within the pump, etc.), the context-aware preventative maintenance system using ongoing sensor data and historical context data to predict a nonconformance, such as a pump failure, before the nonconformance occurs (e.g., while the flowmeter reports output >0, a pressure sensor indicates a pressure differential, etc.). The alerts generated thusly can identify targeted components that have previously been identified as part of the root cause for the predicted nonconformance, thereby allowing operators to prepare for the nonconformance appropriately (e.g., ordering stock for a replacement part, co-scheduling several maintenance events, bringing backup systems online, planning production based around maintenance downtime, etc.).

In response to the message for a specific alert, an operator can identify the contribution of each root cause to the final score for why the alert was generated. In the present case, the score is the probability of nonconformance in the future horizon T (e.g., 30, 45, 60 days, depending on the preference of the operator) based on several individual factors identified from the data supplied to the context-aware preventative maintenance system. The posterior probability contribution can be expressed according to Formula 1 as:

$$p=f(z) \quad \text{[Formula 1]}$$

With function f(*) as a monotonic increasing function transforming the latent variable z into a probability. But the latent variable z itself comes from the summation of all the factors analyzed to generate the alert. The contribution can thus be quantified using Formula 2 can be written with the composition format:

$$z=b+\Sigma_{i=1}^{N} z_i \quad \text{[Formula 2]}$$

For a given variable $z_i$, there is a corresponding underneath original variable called $x_i$. The $z_i$ is transformed from $x_i$. The relative importance of the contribution for each factor with value as $(x_i)$ is computed as $|z_i/z|$. The sign of $z_i$ indicates whether the selection makes the probability increasing or decreasing of the overall probability of predicting a nonconformance.

$$z=b+z_j+\Sigma_{i=1,i\neq j}^{N} z_i \quad \text{[Formula 3]}$$

In the present disclosure, Formula 2 is augmented to produce Formula 3, which includes feedback information from the users. If there is any feedback that does not agree with the feature $x_i$, the value of $z_j$ is modified with a positive weight that is less than 1. If there are many such feedbacks, the model is retrained to remove the feature from analysis.

In the following example, f(*) has its simplest form, that is f(z)=z. Then, the b is the default probability (prior probability) without any knowledge of each individual values of the specific attributes. The posterior probability is defined as above in Formula 1. For the case of modifying weights based on feedback, a decaying weight $\alpha \leq 1$ is chosen to produce Formula 4 as:

$$z=b+\alpha z_j+\Sigma_{i=1,i\neq j}^{N} z_i \quad \text{[Formula 4]}$$

Possible implementations of the above formulas can include models using logistic regression, attention models, and random forest models. One example of a random forest implementation is provided below in reference to Table 1 in which the model predicts a probability of a nonconformity (X) for a given asset (A) on a given day (D) for a pre-defined time horizon T, where the nonconformity probability is explained using features extracted from a sensor data set with established biases (b). The features are drawn from a dataset for an asset of an oil pump that includes features of the average value of Estimated Fluid of Oil Pumped for last 15 and last 30 days (e.g., mean_15_estfluidc and mean_30_estfluidc), the variation in pump off events in last 60 days (e.g., stddev_60_downtimefile_off), the 60 days Standard Deviation of Daily Pump Downtime, (e.g., min_15_pmpcycls), the Minimal of Daily Pump Cycle of Last 15 days (e.g., stddev_15_fill_pumphrs), the Standard Deviation of Pump Fill Horsepower and the final probability of a single path nonconformity (e.g., per Formula 3 using the values indicated in Table 1). According to Table 1, the value of bias indicates (without being providing additional information) that the chance of a nonconformity is 33% for any given asset on any given day. Based on global learning, the model uses the several identified features to update the base nonconformity probability, according to Formula 3 and the values of the selected features, to produce the final probability of a nonconformity in the selected asset on a given day D. The intermediate nonconformity probabilities and adjusted final nonconformity probabilities (e.g., Table 1) can be provided to human operators to help explain why an alert or work order has been generated, which the human operator can validate to accept or reject in making a decision for whether to act on a given alert or proposed work order.

The similar probability table can be generated from the work order features, and the two set of probability tables can be combined to become the additional explanation message for a specific alert is generated. Aligned with the action on the alert, the human operator can add additional feedback on the explain message generated from the machine learning algorithm.

Figure 8:
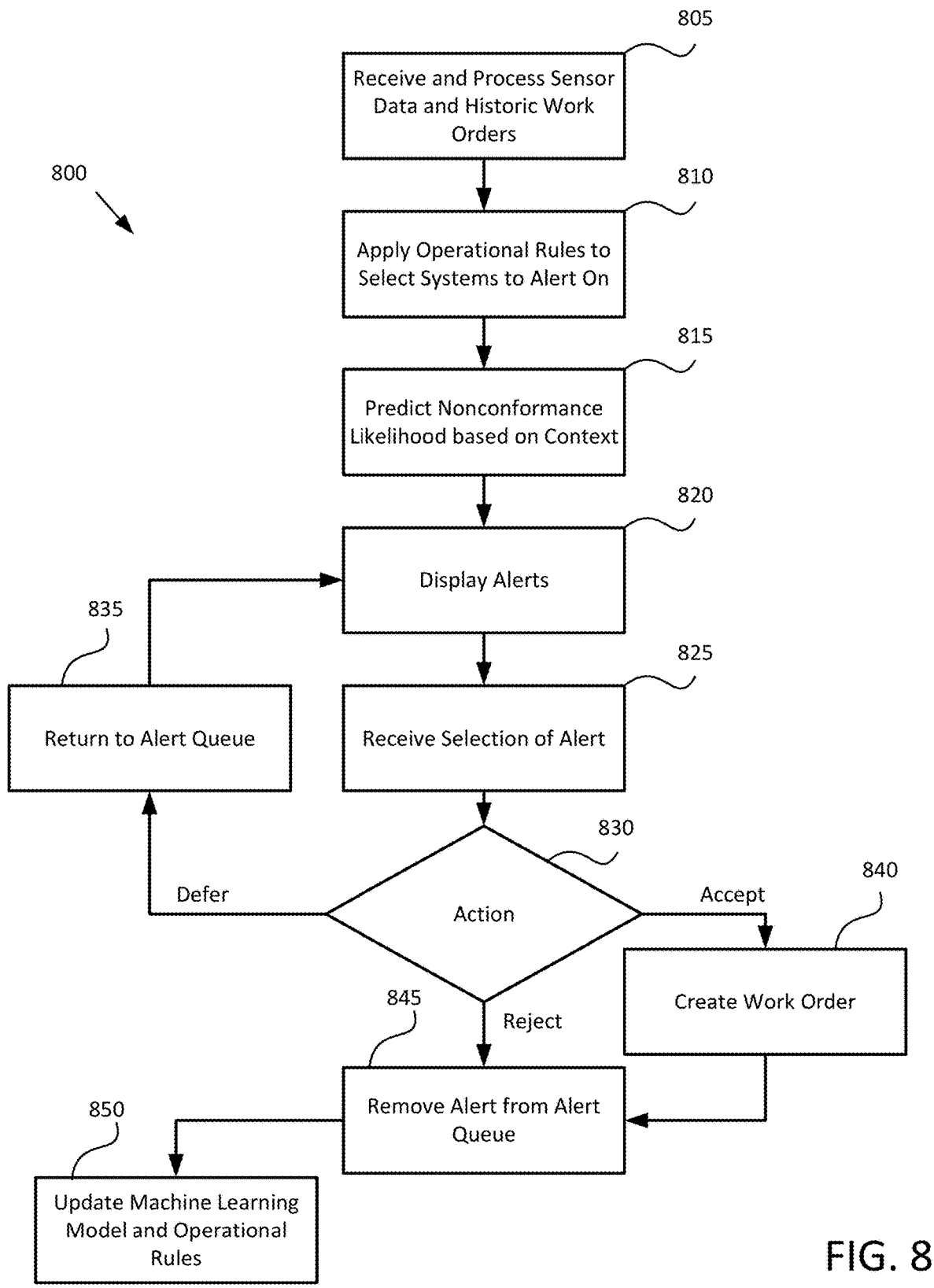
FIG. 8 is a flowchart for a method for providing context-awareness in preventative maintenance, according to embodiments of the present disclosure.

FIG. 8 is a flowchart for a method 800 for providing context-awareness in preventative maintenance, according to embodiments of the present disclosure. Method 800 begins with block 805, where a developed context-aware preventative maintenance system (e.g., developed according to flows 300-700 discussed in relation to FIGS. 3-7) receives and processes sensor data from the systems monitored by the context-aware preventative maintenance system. In various embodiments, the received sensor data may be received in real-time as part of a continuous stream from one or more individual monitored systems, as a batch file received sporadically or at known intervals from one or more individual monitored systems, and combinations thereof.

The received sensor data are augmented with work orders to develop the context in which each of the monitored systems are operating (or not operating) in. The context-aware preventative maintenance system extracts a first set of features from the work orders that are related to the monitored systems. Individual work orders in the set of work orders include a root cause analyses for previous nonconformances for the particular monitored system including individual parts deemed as contributing to the root cause, how the nonconformance was resolved, the identities of components contributing to the nonconformance, an extent of the nonconformance (e.g., system down, system operating at reduced capacity), a timing of the nonconformance, and a time of installation or last maintenance event affecting the component. The context-aware features from work order can be selected based on univariate factor (each factor could contain one to multiple features) analysis to keep those important factors for root cause analysis (Table 2). A threshold can be defined (say >=0.55) for AUC (Area Under the Curve) to remove those factors are not significant impact on the future failure, which can be carried out using logistic regression or random forest.

TABLE 2

Context-aware feature from the work order:

| Features | Logistic Regression (AUC) | Random Forest (AUC) |
| --- | --- | --- |
| Past Recorded Failures | 0.59 | 0.58 |
| Observation Month | 0.55 | 0.56 |
| Up-time Encoding | 0.79 | 0.79 |

TABLE 1

| Features Explained | Features | Intermediate Nonconformity Probability ($z_i$) | Final Nonconformity Probability (z) |
| --- | --- | --- | --- |
| Default Prior Probability | Bias (b) | 0.33 | 0.33 |
| Average 15 Days Minutes Estimated Fluid of Oil Pumped | mean_15_estfluidc | −0.12 | 0.21 |
| 60 days Standard Deviation of Daily Pump Downtime | stddev_60_downtimefile_off | 0.04 | 0.25 |
| Average 30 Days Daily Estimated Fluid of Oil Pumped | mean_30_estfluidc | −0.03 | 0.22 |
| Minimal of Daily Pump Cycle of Last 15 days | min_15_pmpcycls | −0.02 | 0.20 |
| Standard Deviation of Pump Fill Horsepower | stddev_15_fill_pumphrs | 0.13 | 0.33 |
| Final Probability of Single Path | Final Probability of Single Path | | .48 |

TABLE 2-continued

Context-aware feature from the work order:

| Features | Logistic Regression (AUC) | Random Forest (AUC) |
|---|---|---|
| Up-time Encoding using Component Grouping | 0.63 | 0.63 |
| Number of Installed Components and Installation Days | 0.58 | 0.59 |
| Down Event Features | 0.62 | 0.64 |
| Last Up-time Encoding | 0.61 | 0.61 |
| Down-time Encoding | 0.63 | 0.63 |
| Last Down time Encoding | 0.53 | 0.53 |
| Average Run Day Encoding | 0.6 | 0.6 |
| Location Feature Encoding | 0.65 | 0.65 |

In some embodiments, processing the historic work order includes various data standardization and cleanup actions, as the work orders often include natural language text. For example, spelling correction, missing value replacement (e.g., using a known value for a system from a different work order or other domain knowledge) or missing value identification (e.g., leaving a null or known placeholder value).

The context developed for the sensor data can include various features learned about the monitored system from values reported in work orders, domain knowledge supplied by an operator, and historical processed records for the monitored system (e.g., an average value for a given feature when operating per standards). The contextual data developed for a given system can include locational data for the monitored system, environmental data affecting the monitored system (e.g., weather conditions at the system), manufacturer data for a component of the monitored system, operator data for completing a work order, and requestor data for generating a work order.

At block 810, the context-aware preventative maintenance system applies operational rules to select monitored systems to alert on as experiencing nonconformances. The operational rules allow the preventative maintenance system to analyze the received data and to generate alerts when one or more values for one or more features satisfy the operational rule without performing a computationally complex machine learning analysis of those systems. For example, incoming data for a flow output when reading zero can be interpreted to indicate a current nonconformance without requiring the ML-model to analyze the data. In another example, sensor data fluctuating erratically between values may satisfy an operational rule indicating that a nonconformance is likely to occur within the next D days (but has not occurred yet).

The operational rules may be based on received user selections of one or more alerts that were previously presented, in which when a given type of alert is selected for further analysis by the human operator at a frequency above a rule above a rule generation threshold. The operational rules are thus created based on one or more values found in the features shared in common by the one or more alerts selected by the human user. For example, when the context-aware preventative maintenance system identifies that at least X % of the alerts selected by a human user for further analysis include feature Y having a value below Z, where X is greater than the rule generation threshold, the context-aware preventative maintenance system generates an operational rule so that the next time data indicates that a system has feature Y with a value below Z, that an alert is generated for the attention of the human user.

At block 815, the context-aware preventative maintenance system uses a machine learning model to predict the nonconformance likelihoods of the monitored systems based on the context in which those systems are operating. The machine learning model uses the values for the various identified features to predict how likely it is for each given monitored system to experience a nonconformance within a given period of time, and to identify which components of the system are likely to be the root cause(s) leading to the predicted nonconformance.

At block 820, the context-aware preventative maintenance system displays a first set of alerts, wherein the first set of alerts includes a subset of alerts selected based on the alerts generated from the predicted nonconformance likelihoods and the operational rules. In various embodiments, the first set of alerts is formatted to display the top-k alerts so that the k alerts assigned the highest scores by the context-aware preventative maintenance system are displayed to a human user (e.g., in a dashboard application). For example, when k=10, the human user is presented with the ten alerts ranked to have the highest relevancy scores to the human user based on previous acceptances/rejections of alerts by the human user.

At block 825, the context-aware preventative maintenance system receives selections of the alerts from the human user indicating whether a presented alert should be deferred for further analysis at a later time, accepted for processing at the current time, or rejected for processing.

At block 830, the context-aware preventative maintenance system perform the selected action indicated by the user. When the user indicates that an alert is to be deferred, for example, when the user believes that the alert is has not ripened to requiring action yet, is minor, require additional monitoring before acting, etc., method 800 proceeds to block 835 from block 830. When the user indicates that an alert is to be accepted, for example, when the user believes that the alert is worthy of acting on with the present data, can be co-scheduled with another maintenance activity, etc., method 800 proceeds to block 840 from block 830. When the user indicates that an alert is to be rejected, for example, when the user believes the data generating the alert is erroneous, that the alert is for a minor issue, that the indicated nonconformance is too far out to address at the current time, that other alerted nonconformances are more pressing, etc., method 800 proceeds to block 845 from block 830.

At block 835, the context-aware preventative maintenance system returns the alert to the queue for further analysis at a later time. In various embodiments, the alert is associated with a timer so that the alert is not presented again in the top-k results for at least a predefined amount of time or unless the severity of the alert increases above an alerting threshold. In some embodiments, the deferred alert remain presented in the top-k results until accepted or rejected by a user.

At block 840, the context-aware preventative maintenance system generates a work order based on the alert. The created work order offers an explanation of the predicted nonconformance and how to resolve the predicted nonconformance and is used to schedule resources (including inventory, tools, and operators) to preventively address the predicted nonconformance before it develops into an actual nonconformance. The work order may specify: which user requested/authorized the work order, who will perform the labor, what the task at hand is, when the labor is to be completed by, which system and components thereof (including the locations thereof) are to worked with, and how to complete the task requested (including the tools and parts required therefore). Method 800 proceeds to block 845 from block 840.

At block 845, the context-aware preventative maintenance system removes the indicated alert from the displayed top-k alerts. Whether the indicated alert was accepted or rejected by the user, the alert is associated with a timer so that the alert is not presented again in the top-k results for at least a predefined amount of time or unless the severity of the alert increases above an alerting threshold. For example, a system that had an alert accepted and originally scheduled for preventative maintenance via a work order (generated per block 840) may worsen unexpectedly or indicate that a second component is predicted to require preventative maintenance, but otherwise should not be alerted on before the work order is completed. In a further example, a system that had an alert rejected, may have been rejected because the user did not believe the predicted nonconformance was serious enough (or soon enough) to warrant preventative maintenance, and therefore should not be re-presented to the user until the severity of the predicted nonconformance is greater or the predicted nonconformance is sooner to the current time.

At block 850, the context-aware preventative maintenance system updates the machine learning model and operational rules based on the user's selection for how to handle the individual alerts (per block 825). In various embodiments, in addition to indicating the deferment/acceptance/rejection of a given alert, the user provides (e.g., via natural language or a form-defined criteria list) a reason why a given action was selected for a particular alert, which can be combined with the existing root cause and context analyses to modify how the machine learning model interprets future data, and what operational rules are used to generate alerts. The machine learning models and/or operational rule sets are thereby updated to predict the subsequent nonconformance likelihoods with greater accuracy, greater speed, and/or greater alignment with the human user's interpretation of the most pressing potential nonconformances.

In various embodiments, the context-aware preventative maintenance system increases accuracy, speed, and output alignment by reducing the number of features analyzed by the machine learning model, and shifting analysis to operational rules where possible. For example, when generating a second set of alerts (using user selection feedback from a first set of alerts), the machine learning model uses a second set of features that excludes a feature identified by the user (that was present in an earlier-used set of features by an earlier version of the machine learning model). In some embodiments, features are removed from analysis by the ML model when an operation rule based on that feature is developed. In some embodiments, the features are removed when a threshold number of human operators have indicated that the feature is not relevant to their decision-making process in whether to accept/reject an alert.

Figure 9:
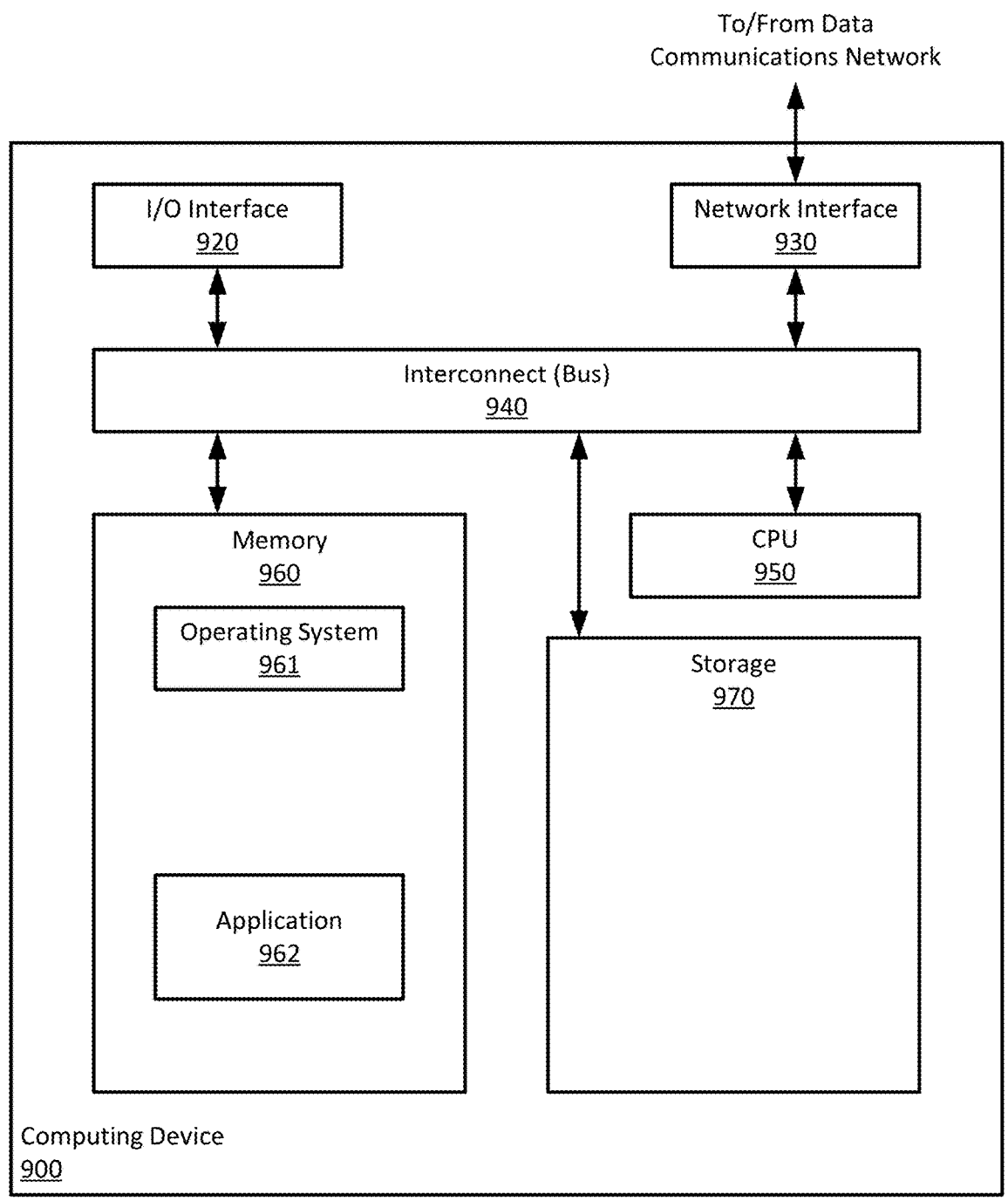
FIG. 9 illustrates a computing system, according to embodiments of the present disclosure.

FIG. 9 illustrates a computing system 900, according to embodiments of the present disclosure. As shown, the computing system 900 includes, without limitation, a central processing unit (CPU) 950, a network interface 930, an interconnect 940, a memory 960, and storage 970. The computing system 900 may also include an I/O device interface 920 connecting I/O devices 910 (e.g., keyboard, keypad, display, touchscreen, biometric scanner, and mouse devices) to the computing system 900.

The CPU 950 retrieves and executes programming instructions stored in the memory 960. Similarly, the CPU 950 stores and retrieves application data residing in the memory 960. The interconnect 940 facilitates transmission, such as of programming instructions and application data, between the CPU 950, I/O device interface 920, storage 970, network interface or other interconnect 940, and memory 960. CPU 950 is included to be representative of a single CPU, a microprocessor, multiple CPUs, a single CPU having multiple processing cores, and the like. And the memory 960 is generally included to be representative of a random access memory. The storage 970 may be a disk drive storage device. Although shown as a single unit, the storage 970 may be a combination of fixed and/or removable storage devices, such as magnetic disk drives, flash drives, removable memory cards or optical storage, network attached storage (NAS), or a storage area-network (SAN). The storage 970 may include both local storage devices and remote storage devices accessible via the network interface 930 (e.g., cloud storage).

Further, although shown as a single computing system, one of ordinary skill in the art will recognized that the components of the computing system 900 shown in FIG. 9 may be distributed across multiple computing systems connected by a data communications network.

As illustrated, the memory 960 includes an operating system 961, which may include one or more file systems, and a set of processor instructions to perform various actions as described herein. These actions may be informed and formatted according to various applications 962 running in the memory as instructions executed by the CPU 950.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
receiving sensor data from a plurality of monitored systems;
extracting a first plurality of features from a set of work orders for the plurality of monitored systems, wherein individual work orders in the set of work orders include a root cause analysis for a context in which a nonconformance in an indicated monitored system occurred;
generating a first alert using a first operational rule without analyzing the first plurality of features by a machine learning model, wherein the first operational rule is based on a first user selection of one or more alerts with a frequency above a rule generation threshold;
predicting, via the machine learning model, a nonconformance likelihood for each monitored system in the plurality of monitored systems based on the first plurality of features;
generating a first set of alerts comprising a subset of alerts selected based on predicted nonconformance likelihoods for the plurality of monitored systems and based on a plurality of operational rules;
in response to receiving a second user selection indicating an acceptance or rejection of one or more of the alerts from the first set of alerts and a reason for the second user selection of the selected alerts, recording the reason as an additional feature to combine with existing root cause and context analysis as a modifier for the machine learning model; and
updating the machine learning model to predict subsequent nonconformance likelihoods using a second plurality of features and the modifier for the machine learning model, wherein the modifier excludes at least one feature in the first plurality of features from the second plurality of features.

2. The method of claim 1, wherein generating the first alert further comprises:
in response to receiving the first user selection of one or more alerts from the first set of alerts with a frequency above the rule generation threshold, creating the first operational rule based on one or more values for one or more features shared by the one or more alerts; and
before predicting, via the machine learning model, the subsequent nonconformance likelihood for each monitored system in the plurality of monitored systems based on the second plurality of features:
comparing the one or more values for the one or more features against the first operational rule; and
in response to the one or more values for the one or more features satisfying the first operational rule, generating the first alert without analyzing the features by the machine learning model.

3. The method of claim 1, wherein individual work orders of the set of work orders identify a component of the monitored system affected by the nonconformance, an extent of the nonconformance, a timing of the nonconformance, and a time of installation or last maintenance event affecting the component.

4. The method of claim 1, further comprising:
identifying a missing value in a given work order of the set of work orders; and
inserting a substitute value for the missing value based on domain knowledge for the given work order.

5. The method of claim 1, further comprising:
ranking the first set of alerts relative to a set of active alerts;
identifying a given number of highest rated alerts according to the ranking; and
displaying the highest rated alerts.

6. The method of claim 1, wherein the context is based on contextual data that include:
locational data for the monitored system,
environmental data affecting the monitored system,
manufacturer data for a component of the monitored system,
operator data for completing a work order,
monitored sensor data feature, and
requestor data for generating a work order.

7. The method of claim 1, further comprising:
generating a maintenance request in response to receiving a user selection of a given one of the one or more alerts from the first set of alerts, wherein the maintenance request identifies a predicted time of nonconformance and one or more components of the monitored system affected by the nonconformance.

8. The method of claim 1, further comprising:
updating the machine learning model based on feedback from a human operator, the update including one or more of:
adjusting a weight of a specific factor in identifying a final probability of nonconformance;
removing a certain factor from the machine learning model; and
generating a new machine learning model.

9. A computer readable storage medium including instructions that when executed by a processor enable the processor to perform operations comprising:
receiving sensor data from a plurality of monitored systems;
extracting a first plurality of features from a set of work orders for the plurality of monitored systems, wherein individual work orders in the set of work orders include a root cause analysis for a context in which a nonconformance in an indicated monitored system occurred;
generating a first alert using a first operational rule without analyzing the first plurality of features by a machine learning model, wherein the first operational rule is based on a first user selection of one or more alerts with a frequency above a rule generation threshold;
predicting, via the machine learning model, a nonconformance likelihood for each monitored system in the plurality of monitored systems based on the first plurality of features;
generating a first set of alerts comprising a subset of alerts selected based on predicted nonconformance likelihoods for the plurality of monitored systems and based on a plurality of operational rules;
in response to receiving a second user selection indicating an acceptance or rejection of one or more of the alerts from the first set of alerts and a reason for the second user selection of the selected alerts, recording the reason as an additional feature to combine with existing root cause and context analysis as a modifier for the machine learning model; and
updating the machine learning model to predict subsequent nonconformance likelihoods using a second plurality of features and the modifier for the machine learning model, wherein the modifier excludes at least one feature in the first plurality of features from the second plurality of features.

10. The computer readable storage medium of claim 9, wherein generating the first alert further comprises:

in response to receiving the first user selection of one or more alerts from the first set of alerts with a frequency above the rule generation threshold, creating the first operational rule based on one or more values for one or more features shared by the one or more alerts; and before predicting, via the machine learning model, the subsequent nonconformance likelihood for each monitored system in the plurality of monitored systems based on the second plurality of features:

comparing the one or more values for the one or more features against the first operational rule; and in response to the one or more values for the one or more features satisfying the first operational rule, generating the first alert without analyzing the features by the machine learning model.

11. The computer readable storage medium of claim 9, wherein individual work orders of the set of work orders identify a component of the monitored system affected by the nonconformance, an extent of the nonconformance, a timing of the nonconformance, and a time of installation or last maintenance event affecting the component.

12. The computer readable storage medium of claim 9, wherein the context is based on contextual data that include:
locational data for the monitored system,
environmental data affecting the monitored system,
manufacturer data for a component of the monitored system,
operator data for completing a work order,
monitored sensor data feature, and
requestor data for generating a work order.

13. The computer readable storage medium of claim 9, wherein the operations further comprise:
generating a maintenance request in response to receiving a user selection of a given one of the one or more alerts from the first set of alerts, wherein the maintenance request identifies a predicted time of nonconformance and one or more components of the monitored system affected by the nonconformance.

14. The computer readable storage medium of claim 9, wherein the operations further comprise:
updating the machine learning model based on feedback from a human operator, the update including one or more of:
adjusting a weight of a specific factor in identifying a final probability of nonconformance;
removing a certain factor from the machine learning model; and
generating a new machine learning model.

15. A system, comprising:
a processor; and
a memory including instructions that when executed by the processor enable the processor to:
receive sensor data from a plurality of monitored systems;
extract a first plurality of features from a set of work orders for the plurality of monitored systems, wherein individual work orders in the set of work orders include a root cause analysis for a context in which a nonconformance in an indicated monitored system occurred;
generate a first alert using a first operational rule without analyzing the first plurality of features by a machine learning model, wherein the first operational rule is based on a first user selection of one or more alerts with a frequency above a rule generation threshold;
predict, via a machine learning model, a nonconformance likelihood for each monitored system in the plurality of monitored systems based on the first plurality of features;
generate a first set of alerts comprising a subset of alerts selected based on predicted nonconformance likelihoods for the plurality of monitored systems and based on operational rules;
in response to receiving a second user selection indicating an acceptance or rejection of one or more of the alerts from the first set of alerts and a reason for the second user selection of the selected alerts, record the reason as an additional feature to combine with existing root cause and context analysis as a modifier for the machine learning model; and
update the machine learning model to predict subsequent nonconformance likelihoods using a second plurality of features and the modifier for the machine learning model, wherein the modifier excludes at least one feature in the first plurality of features from the second plurality of features.

16. The system of claim 15, wherein generating the first alert further comprises:
in response to receiving the first user selection of one or more alerts from the first set of alerts with a frequency above the rule generation threshold, create the first operational rule based on one or more values for one or more features shared by the one or more alerts; and
before predicting, via the machine learning model, the subsequent nonconformance likelihood for each monitored system in the plurality of monitored systems based on the second plurality of features:
compare the one or more values for the one or more features against the first operational rule; and
in response to the one or more values for the one or more features satisfying the first operational rule, generate the first alert without analyzing the features by the machine learning model.

17. The system of claim 15, wherein individual work orders of the set of work orders identify a component of the monitored system affected by the nonconformance, an extent of the nonconformance, a timing of the nonconformance, and a time of installation or last maintenance event affecting the component.

18. The system of claim 15, wherein the instructions, when executed, further enable the processor to:
identify a missing value in a given work order of the set of work orders; and
insert a substitute value for the missing value based on domain knowledge for the given work order.

19. The system of claim 15, wherein the instructions, when executed, further enable the processor to:
rank the first set of alerts relative to a set of active alerts;
identify a given number of highest rated alerts according to the ranking; and
display the highest rated alerts.

20. The system of claim 15, wherein the context is based on contextual data that include:
locational data for the monitored system,
environmental data affecting the monitored system,
manufacturer data for a component of the monitored system,
operator data for completing a work order,
monitored sensor data feature, and
requestor data for generating a work order.

* * * * *